United States Patent
Zhang et al.

(10) Patent No.: US 11,108,242 B2
(45) Date of Patent: Aug. 31, 2021

(54) METHOD AND SYSTEM FOR LOAD SHARING AMONG MULTIPLE DC GENERATORS

(71) Applicant: GE Aviation Systems, LLC, Grand Rapids, MI (US)

(72) Inventors: Jinhui Zhang, Dayton, OH (US); Slobodan Gataric, Xenia, OH (US)

(73) Assignee: GE AVIATION SYSTEMS, LLC, Grand Rapids, MI (US)

( * ) Notice: Subject to any disclaimer, the term of this patent is extended or adjusted under 35 U.S.C. 154(b) by 359 days.

(21) Appl. No.: 15/369,852

(22) Filed: Dec. 5, 2016

(65) Prior Publication Data

US 2018/0159334 A1    Jun. 7, 2018

(51) Int. Cl.
H02J 1/00  (2006.01)
H02J 3/00  (2006.01)
H02J 3/46  (2006.01)
H02J 3/12  (2006.01)
H02J 3/38  (2006.01)
H02J 13/00 (2006.01)

(52) U.S. Cl.
CPC  *H02J 3/46* (2013.01); *H02J 3/12* (2013.01); *H02J 3/381* (2013.01); *H02J 13/0017* (2013.01); *Y02E 40/70* (2013.01); *Y04S 10/12* (2013.01)

(58) Field of Classification Search
CPC ...... H02J 3/46; H02J 3/381; H02J 3/12; H02J 13/0017; Y04S 10/12; Y02E 40/72

USPC .......................................................... 307/84
See application file for complete search history.

(56) References Cited

U.S. PATENT DOCUMENTS

| | | | | |
|---|---|---|---|---|
| 6,628,103 B2 * | 9/2003 | Sumiya | ............ | H02J 3/1885 322/20 |
| 6,657,416 B2 * | 12/2003 | Kern | ............ | H02J 9/066 290/40 A |
| 7,319,307 B2 | 1/2008 | Wiegman et al. | | |
| 8,766,479 B2 | 7/2014 | Dorn et al. | | |
| 9,257,838 B2 | 2/2016 | Gataric et al. | | |
| 2013/0049479 A1 * | 2/2013 | Hedquist | ............ | H02J 3/46 307/84 |
| 2013/0234680 A1 * | 9/2013 | Kolwalkar | ............ | H02P 9/105 322/58 |
| 2015/0180280 A1 * | 6/2015 | Frampton | ............ | H02J 3/48 307/53 |
| 2015/0236703 A1 | 8/2015 | Alfermann | | |
| 2015/0236704 A1 * | 8/2015 | Alfermann | ............ | H02J 3/38 700/287 |
| 2016/0094036 A1 | 3/2016 | Alfermann | | |

\* cited by examiner

*Primary Examiner* — Richard Tan
(74) *Attorney, Agent, or Firm* — Wood IP LLC

(57) ABSTRACT

There is provided a system for use with a set of generators. The system includes a processor and a memory including instructions that, when executed by the processor, cause the processor to perform certain operations. The operations can include receiving a command and receiving a signal indicative of a current of at least one generator in the set of generators. The operations can further include causing, based on the command and the signal, a controller to adjust a voltage level of at least one other generator in the set of generators.

20 Claims, 4 Drawing Sheets

METHOD AND SYSTEM FOR LOAD SHARING AMONG MULTIPLE DC GENERATORS

I. TECHNICAL FIELD

The present disclosure relates to power delivery and management using multiple direct current (DC) generators. More particularly, the present disclosure relates to methods and systems for load sharing among multiple DC generators.

II. BACKGROUND

In aircraft systems, multiple generators can be used to deliver power to a variety of loads dispersed throughout the aircraft. In some cases, multiple generators can be used to power a single load. In such cases the load requires more power than any one generator can deliver on its own so multiple generators have to be used in order to service the load. Thus, a set of generators arranged in parallel is typically used to deliver power to the load via a common bus.

However, when multiple generators are connected in parallel, a droop controller is typically used to maintain the system's stability and adjust power sharing. Otherwise, excessive voltage imbalance between the generators can result in high circulating power or undesired power sharing among the multiple generators. This can lead to instability and high power loss or low efficiency. Dynamic power sharing has been shown to permit servicing a load using multiple generators without the aforementioned issues.

Dynamic power sharing schemes in prior arts include load sharing controllers at each of the generators. These schemes further include computing, locally, desired power ratios for each of the generators. As such, these typical schemes are computationally intensive and they may not be executed in real time. Therefore, using current methods and systems, power sharing between multiple generators becomes burdensome as the number of generators required to collectively deliver the power required to service a load increases.

III. SUMMARY

The embodiments featured herein help solve or mitigate the above-noted issues as well as other issues known in the art. For example, the embodiments provide methods and systems for allowing multiple generators to be arranged in parallel to service a load without using computationally intensive power sharing methods. The embodiments can allocate power from the generators on demand in order to optimize the system's efficiency or to allow other advantageous features that will be readily apparent to one of skill in the art based on the teachings described herein.

The embodiments further provide means to allocate power from the multiple generators using a master-slave configuration. Specifically, the embodiments allow configuring one of the multiple generators into one master generator and the remaining one or more generator into slaves. The master generator can collect information from the slaves, and it can send voltage commands to the slaves so that they service the load based on a specific power regimen. The embodiments provide a power management and delivery system that uses less computational power while allowing a centralized controller to provide power-sharing capability from the multiple generators.

One embodiment provides a system for use with a set of generators. The system includes a processor and a memory including instructions that, when executed by the processor, cause the processor to perform certain operations. The operations can include receiving a command and receiving a signal indicative of a current of at least one generator in the set of generators. The operations can further include causing, based on the command and the signal, a controller to adjust a voltage level of at least one other generator in the set of generators. This adjusted voltage is not the common bus voltage; instead it is the voltage of an internal point of the generator. This internal point is close to the common bus. There is generally enough parasitic resistance between the internal point and common bus by terminal contact resistance or cabling resistance or electromagnetic filter. Throughout the document, adjusting voltage level refers to adjusting the voltage level on this internal point of a generator.

Another embodiment provides a system that includes a set of generators connected in parallel. The set of generators includes a first generator and a second generator. The first generator is configured to adjust an output voltage level of the second generator based on load distribution between the second generator and the first generator.

Another embodiment provides a method for load sharing between a set generators. The method includes receiving, by a controller, which may be a separate controller, or the controller of one of the generators, a current from one generator of the set of generators; and issuing, by the controller and to another generator of the set of generators, a command configured to cause the other generator to adjust a voltage level of the other generator.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

In one embodiment, a master generator can be selected from among a set of generators tied to the same bus. The master generator can collect load current information from each slave generator, either through sensors or digital communication between the master generator and the slave generator.

Once the load current information is received, the master generator can execute a method, as shall be described in greater detail below, that determines which individual slave generator output voltage command needs to be adjusted in order to yield a desired load sharing ratio among the generators. The desired load sharing ratio can be used to achieve high energy efficiency or higher power capability.

The generator output voltage commands can be voltage references, and when the slave generators follow these commands, the desired load sharing ratio is achieved. Other embodiments are possible, but in general, the embodiments allow generators to perform load sharing on demand and in real-time.

Figure 1:
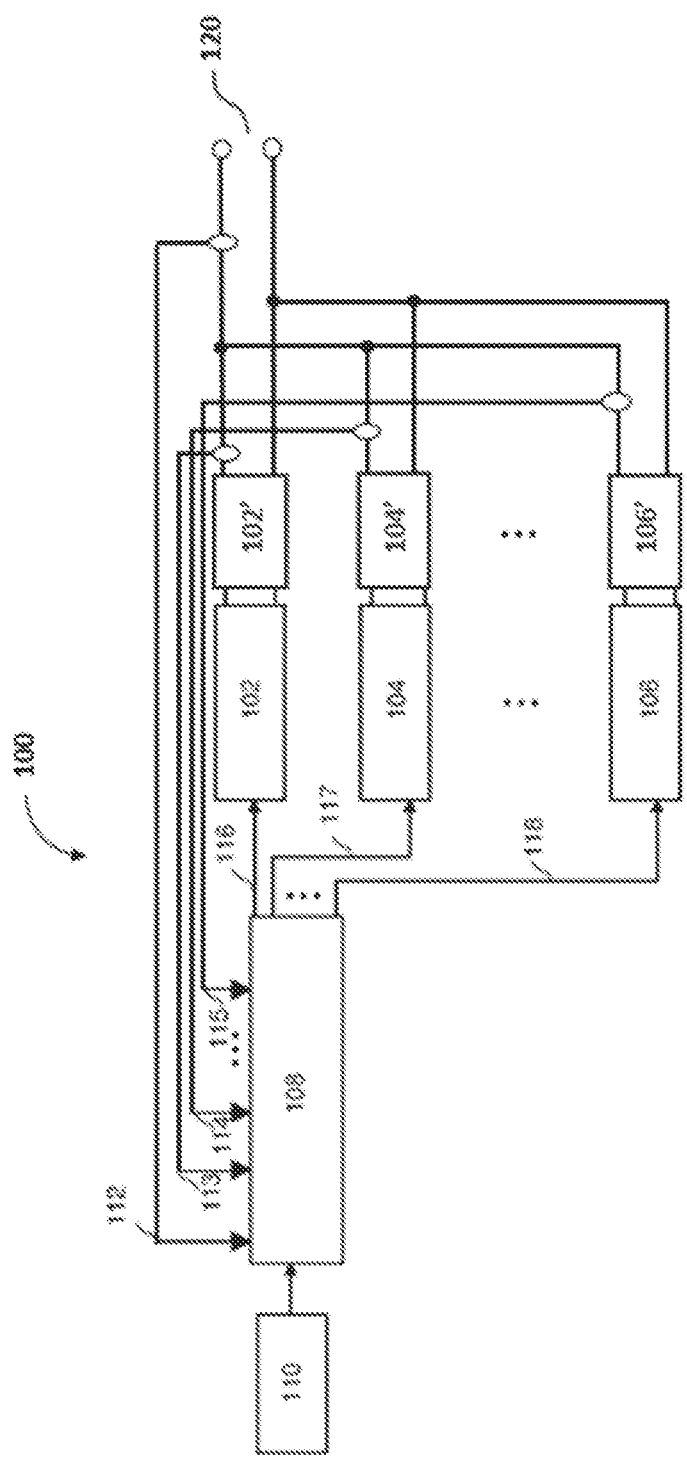
FIG. 1 illustrates a system according to several aspects described herein.

FIG. 1 illustrates a system 100 according to several aspects described herein. The system 100 is coupled to a bus 120 at the end of which one load is connected. The system 100 includes a set of generator controllers 102, 104, 106 being coupled to generators 102', 104', and 106', respectively. While FIG. 1 shows only three generator controllers, the system 100 can include as many generator controllers as there are generators tied to the bus 120.

The system 100 further includes a load sharing controller 108 that is configured to fetch or receive at least one load current 112 from a load tied to the bus 120 and a set of generator currents 113, 114, and 115 from each of the multiple generators tied to the bus 120. As noted before, while only three generators currents associated with the generators are shown, larger numbers of generator currents are possible, depending on the complexity of the system 100.

The load sharing controller 108 is configured to output voltage commands 116, 117, and 118 that are each configured to instruct the respective generator controllers to adjust the output voltage levels of the generators. The system 100 can be configured to fetch or receive the generator currents (or, generally, signals) 113, 114, and 115 and the load current 112 according to a preprogrammed routine in a memory of the load sharing controller 108 in order to generate the voltage commands 116, 117, and 118.

In alternative embodiments, outputting the voltage commands 116, 117, and 118 can be triggered by a command received by the load sharing controller 108 from a peripheral device 110. The peripheral device 110 can be a remote device that is communicatively coupled to the system 100, via a network for example, or it can be an input/output panel that is part of the system 100. Furthermore, the peripheral device 110 can receive the information that triggers the outputting of the voltage commands 116, 117, and 118 in the form of a desired power ratio which can be broken down into specific input share commands, each corresponding to a fractional weight of the collective power output of the multiple generators.

Figure 2:
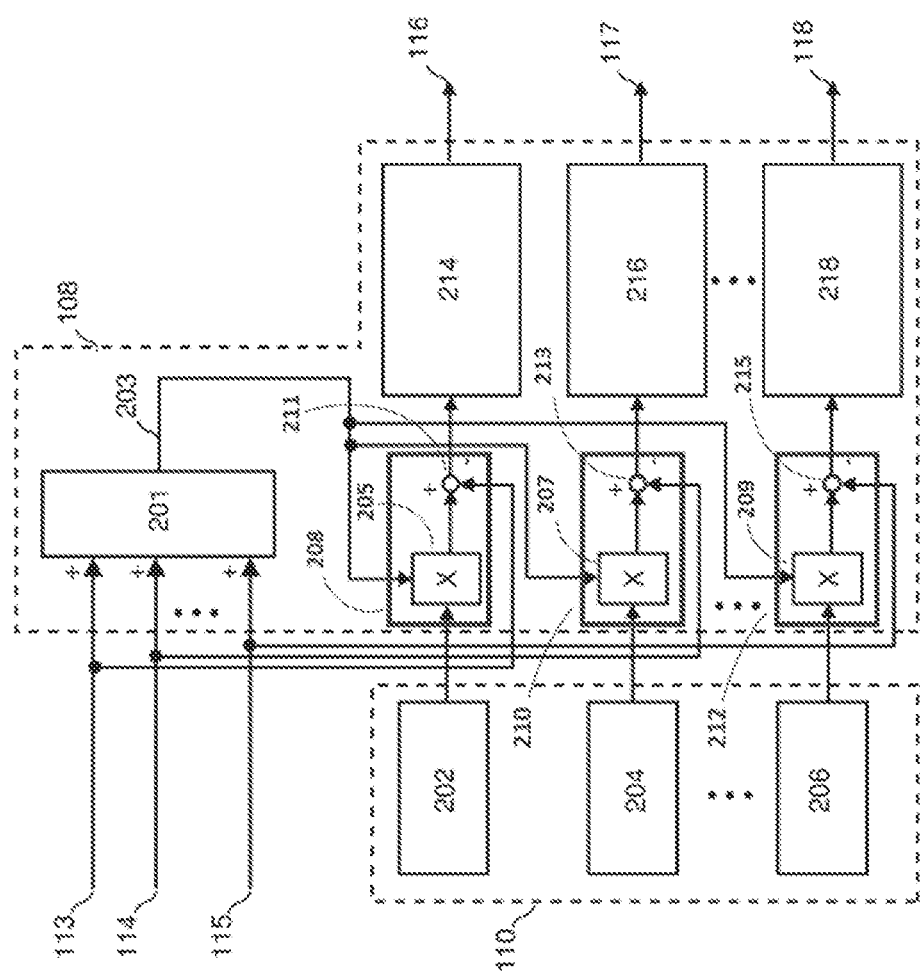
FIG. 2 illustrates a block diagram according to several aspects described herein.

FIG. 2 illustrates a block diagram 200 of the load sharing controller 108 together with the peripheral device 110. While hardware is only shown for three generators, as noted before, additional hardware can be used to accommodate a larger set of generators.

The load sharing controller 108 includes a current summing means 201 that takes as inputs the generator currents 113, 114, and 115 and adds them to yield a total current 203. In another embodiment, the generator currents 113, 114, and 115 may be signals that are generally indicative of the currents measured at the generators' output ports. For example, in such an alternate embodiment, each of the generator currents 113, 114, and 115 may be a digital signal representative of an analog current measured at the corresponding generator's output port. Furthermore, by example and without limitation, the signals (113, 114, and 115) may be encoded according to a data communication protocol.

In yet other embodiments, the signals 113, 114, and 115 may each include several components representative of different variables of interest, i.e., each of signals 113, 114, and 115 can be representative of a generator signal value. For example, a single signal can include information indicative of the current at a generator's output, a phase of the generator's current, the generator's speed, and/or any other variables of interest. In such embodiments, the load sharing controller 108 is configured as a control hub that can receive and process data from the plurality of generators connected to it in addition to performing the load sharing function.

The load sharing controller 108 can further include computational blocks 208, 210, and 212. The computational blocks 208, 210, and 212 comprise multipliers 205, 207, and 209, as well as comparators 211, 213, and 215, respectively. The computational blocks 208, 210, and 212 are configured to output a command to controllers 214, 216, and 218, which each may be Proportional and Integral (PI) controllers that are well known in the art. Furthermore, the load sharing controller 108 can include processing hardware that are configured to decode and process the signals 113, 114, and 115 when they are formatted as described above with respect to the alternate embodiments.

As shown in FIG. 2, each of voltage commands 116, 117, and 118 is associated with a corresponding input share command (202, 204, and 206) and with the total current 203 generated by the current summing means 201. In one exemplary scenario, the generator current 113 originating from the feedback loop formed between the generator 102' and the load sharing controller 108 can be non-zero while the generator currents 114 and 115 can be zero. In such a case, the peripheral device 110 can provide, by way of input share commands 202, 204, and 206, specific weights for the total current 203 (which, in the exemplary scenario is equal to the generator current 113).

As such, each of the controllers 214, 216, and 218 can output a voltage command that is configured to cause its associated generator to output a particular current (or voltage). Therefore, in the above-noted example, the generator current from one generator in a set of generators can be used to control all the generators in the set of generators. Generally, the generator current from at least one generator can be used by the load sharing controller to adjust a voltage or current output level of one or more other generators in the set. Furthermore, it is noted that the aforementioned currents and the voltage commands can be so as to yield a desired contribution of a particular generator to the total power output of the set of generators attached the bus 120.

In general, the load sharing controller 108 may be a microprocessor that is a stand-alone processor independent of either one of the generators in the set of generators, i.e., not included in any one of the generators. However, in some alternate embodiments, the load sharing controller 108 may be part of one generator from the set of generators. That is, it may be included in one of the generators. For example, it may either be embedded within one of the generators or it may be an add-on device that is co-located with either one of the generator controllers 102, or 106. In such a case, the generator with which the load sharing controller 108 is co-located serves as a master generator whereas the other generators serve as slave generators.

Figure 3:
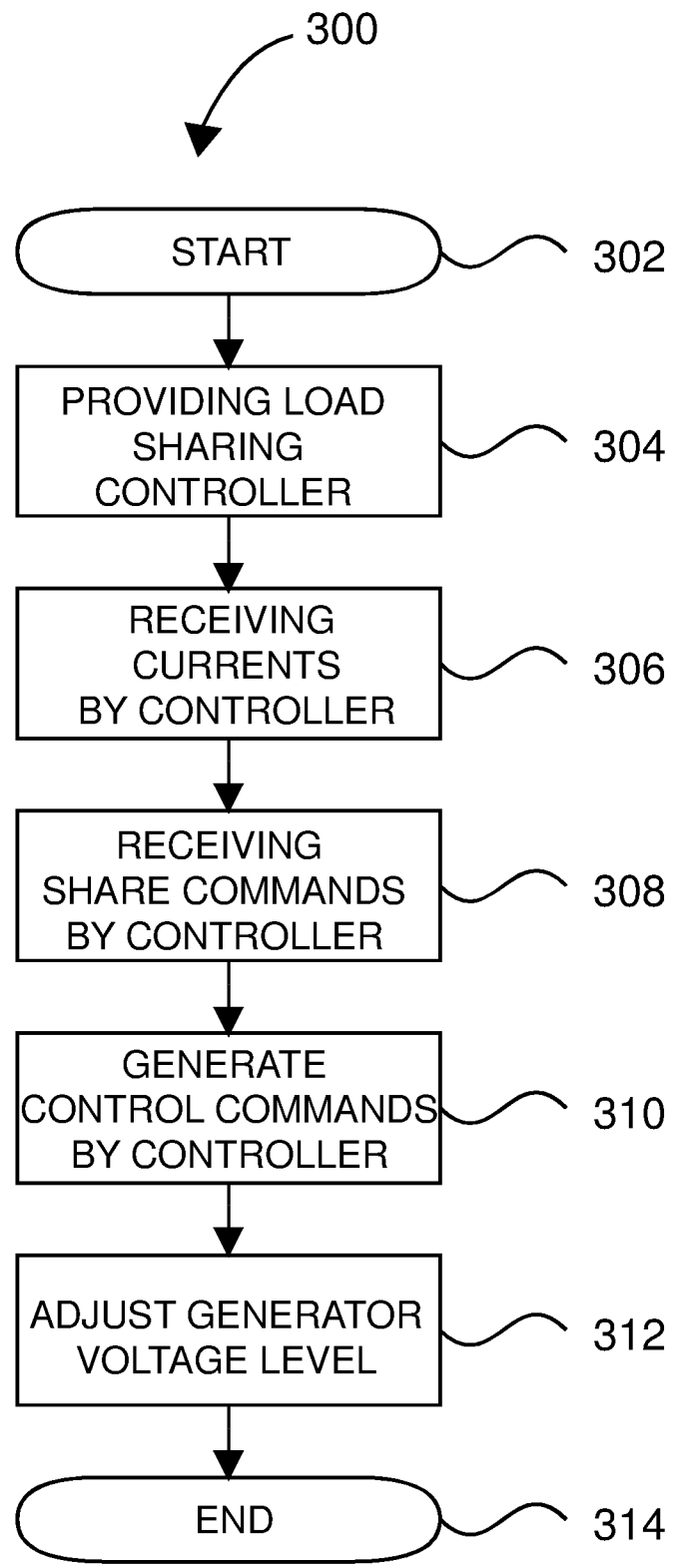
FIG. 3 illustrates a flow chart of a method according to several aspects described herein.

FIG. 3 illustrates a flow chart of a method 300 according to several aspects described herein. The method 300 is a method for providing dynamic and real time load sharing and power control from multiple generators tied in parallel to a common bus. The method 300 is consistent with the functions and devices that are described herein. Moreover, the method 300 can be executed in part or in whole without departing from its intended scope, which is to provide real-time and dynamic load sharing and power control for a set of generators arranged in parallel and tied to a common bus.

The method 300 can start at step 302 and it can include providing a load sharing controller at step 304. The load sharing controller can be configured to fetch or receive load currents and generator currents at step 306. At step 308, the load sharing controller can also be configured to receive share commands that establish a desired power ratio for each of the generators in the set of generators. The method 300 can further include generating, by the controller, a set of control commands that are configured to adjust the voltage level of the generators (step 310). Once the voltage commands are received by the generator controllers, the output voltage of the generators can be adjusted according to the commands, thus yielding specific power ratios consistent with the received share commands. The method 300 can end at step 314. In some embodiments, the method 300 can be used in the loop to continually or periodically adjust power ratios. It is noted that the steps described may be executed in different order or recombined in different ways to achieve the same goal.

Figure 4:
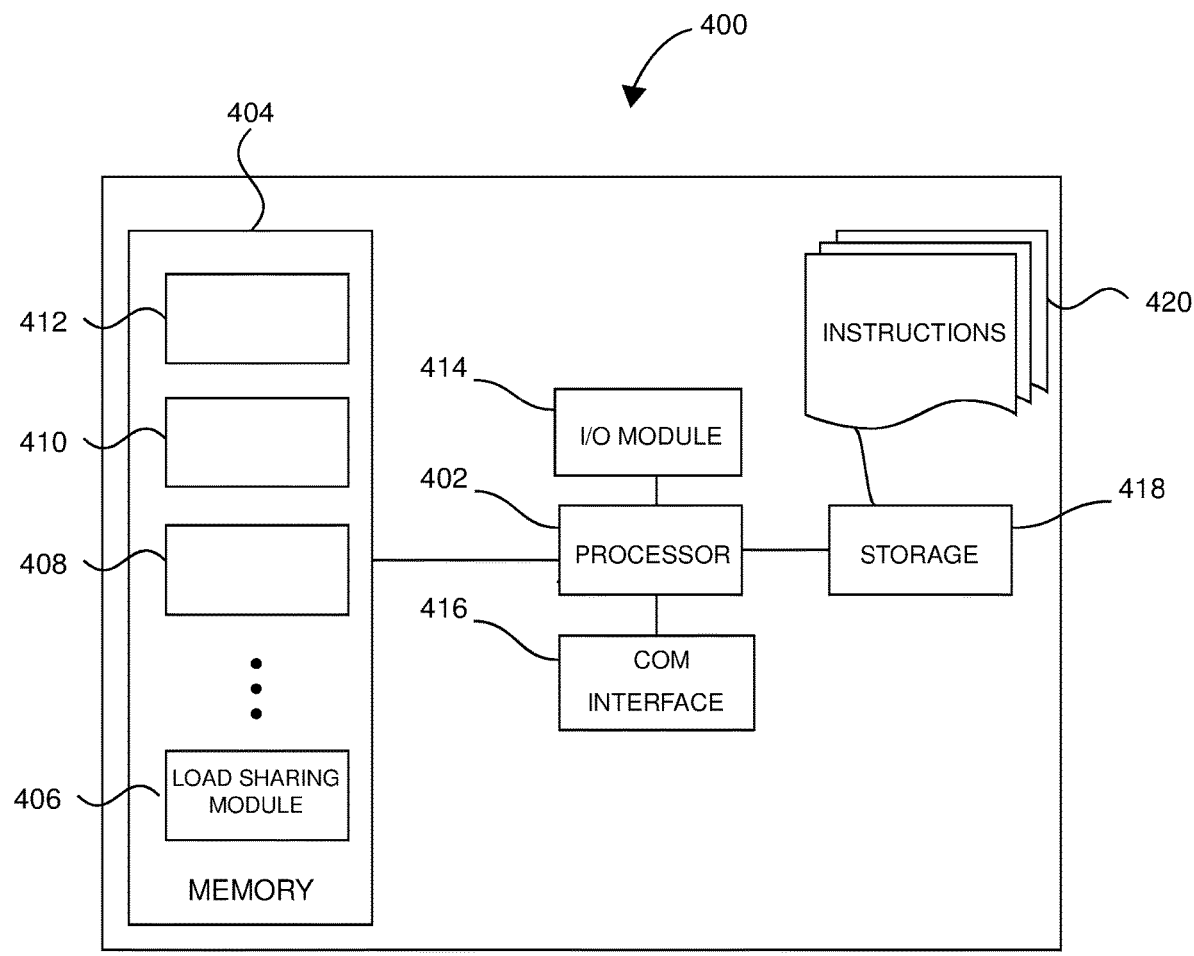
FIG. 4 illustrates a controller according to several aspects described herein.

FIG. 4 illustrates a controller 400 (or system) that can be used as a load sharing controller, in either a stand-alone or generator-integrated configuration. The controller 400 can be configured as a load sharing controller, and the controller 400 can include a processor 402 that has a specific structure. The specific structure can be imparted to the processor 402 by instructions stored in a memory 404 included therein and/or by instructions 420 that can be fetched by the processor 402 from a storage medium 418. The storage medium 418 may be co-located with the controller 400 as shown, or it may be located elsewhere and be communicatively coupled to the controller 400.

As stated previously, the controller 400 can be a stand-alone programmable system, or it can be a programmable module located in a much larger system. For example, the controller 400 can be part of one of the generators. The controller 400 may include one or more hardware and/or software components configured to fetch, decode, execute, store, analyze, distribute, evaluate, and/or categorize information. Furthermore, the controller 400 can include an input/output (I/O) module 414 and/or a communication interface 416 that can be configured to interface with the set of generators in order to fetch or receive load and generator currents. These currents may be analyzed and processed to infer electrical parameters, without limitation, such as amplitude or time-average.

The processor 402 may include one or more processing devices or cores (not shown). In some embodiments, the processor 402 may be a plurality of processors, each having either one or more cores. The processor 402 can be configured to execute instructions fetched from at least one of the memory 406, the memory block 408, the memory block 410, and the memory block 412, i.e., from one of the memory blocks of the memory 404, or the instructions may be fetched from the storage medium 418, or from a remote device connected to the controller 400 via a communication interface 416.

Furthermore, without loss of generality, the storage medium 418 and/or memory 404 may include a volatile or non-volatile, magnetic, semiconductor, tape, optical, removable, non-removable, read-only, random-access, or any type of non-transitory computer-readable computer medium. The storage medium 418 and/or the memory 404 may include programs and/or other information that may be used by the processor 402. Furthermore, the storage medium 418 may be configured to log data processed, recorded, or collected during the operation of controller 400. The data may be time-stamped, location-stamped, cataloged, indexed, or organized in a variety of ways consistent with data storage practice.

In one embodiment, for example, the memory block 406 may include instructions that, when executed by the processor 402, cause the processor 402 to perform certain operations. The operations can include causing the controller to cause an adjustment in a voltage level of at least one generator coupled to the controller 400. The adjustment can be based on at least one of a current of the generator, a load current, and an input share command. A feedback loop can carry a current or a signal indicative of a current from the at least one generator to the controller.

The operations can further include receiving a command configured to cause a generator controller to adjust the voltage level of the generator. The operations can further include outputting a command configured to cause at least one generator to adjust the voltage level. The command can be a voltage signal.

Those skilled in the relevant art(s) will appreciate that various adaptations and modifications of the embodiments described above can be configured without departing from the scope and spirit of the disclosure. In addition, the disclosed approach of control power sharing among multiple generators may be achieved through hardware implementation based on the same principle. Therefore, it is to be understood that, within the scope of the appended claims, the disclosure may be practiced other than as specifically described herein.

What is claimed is:

1. A system for controlling a plurality of generators electrically connected together to produce a collective power, the system comprising: a load sharing controller comprising:
   a summing device for combining actual currents respectively output from the plurality of generators to produce a total current;
   a plurality of computational blocks, each corresponding to one of the plurality of generators and including first and second stage processors;
   wherein the first stage processor is configured to receive the total current, and receive an input share command, the input share command being (i) associated with a corresponding generator and (ii) representative of a fractional portion of the collective power; and output a respective desired current value; and
   wherein the second stage processor compares the respective desired current value with its respective actual current value and produces a corresponding current command; and a plurality of feedback devices respectively corresponding to the plurality of computational blocks; each configured to receive its corresponding current command and output a corresponding adjustment signal.

2. The system of claim 1, wherein at least one generator of the plurality of generators, or the load sharing controller, generates an output command configured to cause load sharing by adjusting a voltage of the plurality of generators.

3. The system of claim 2, wherein the output command is a voltage signal.

4. The system of claim 1, wherein the plurality of generators include a master generator, or the load sharing controller, and at least one slave generator.

5. The system of claim 4, further comprising a signal being indicative of a total current signal.

6. The system of claim 5, wherein the signal is an encoded signal.

7. The system of claim 4, further comprising a signal that is indicative of a current of the master generator from the plurality of generators.

8. The system of claim 1, wherein receiving the corresponding current command includes receiving the input share command associated with the corresponding generator, from a peripheral device communicatively coupled to a processor.

9. The system of claim 1, wherein the load sharing controller is a processor, the processor being (i) either included in one generator of the plurality of generators or (ii) a stand-alone processor.

10. The system of claim 1, wherein each computational block is further configured to output the corresponding current command to a corresponding generator controller.

11. The system of claim 10, wherein the generator controller is configured as a Proportional Integral (PI) controller.

12. A system, comprising:
a plurality of generators connected in parallel, the plurality of generators including a first generator and one or more additional generators; and
a load sharing controller comprising:
a summing device for combining actual currents respectively output from the plurality of generators to produce a total current;
a plurality of computational blocks, each corresponding to one of the plurality of generators and including first and second stage processors;
wherein the first stage processor is configured to receive the total current, and receive an input share command, the input share command being (i) associated with a corresponding generator and (ii) representative of a fractional portion of a collective power; and output a respective desired current value; and
wherein the second stage processor compares the respective desired current value with its respective actual current value and produces a corresponding current command; and
a plurality of feedback devices respectively corresponding to the plurality of computational blocks; each configured to receive its corresponding current command error signal and output a corresponding adjustment signal.

13. The system of claim 12, wherein the plurality of generators include a first generator configured to adjust an output voltage level of a second generator of the plurality of generators.

14. The system of claim 13, wherein the first generator is configured to establish a predetermined power output ratio between the first generator and the second generator.

15. A method for load sharing between a plurality of generators, the method comprising:
providing a load sharing controller comprising:
a summing device for combining actual currents respectively output from the plurality of generators to produce a total current;
a plurality of computational blocks, each corresponding to one of the plurality of generators and including first and second stage processors;
wherein the first stage processor is configured to receive the total current, and receive an input share command, the input share command being (i) associated with a corresponding generator and (ii) representative of a fractional portion of a collective power; and output a respective desired current value; and
wherein the second stage processor compares the respective desired current value with its respective actual current value and produces a corresponding current command; and
a plurality of feedback devices respectively corresponding to the plurality of computational blocks; each configured to receive its corresponding current command and output a corresponding adjustment signal.

16. The method of claim 15, further comprising a current originating from a feedback loop formed between a specified generator of the plurality of generators and the load sharing controller.

17. The method of claim 16, further comprising receiving a command, by the load sharing controller, the command being configured to initiate an adjustment of a voltage level of the plurality of generators.

18. The method of claim 16, further comprising receiving a command, either by a master generator of the plurality of generators, or the load sharing controller, wherein the command is configured to establish a predetermined power ratio between the one generator of the plurality of generators and the at least one other generator of the plurality of generators.

19. The method of claim 15, wherein at least one generator of the plurality of generators, or the load-sharing controller, generates an output command configured to cause load sharing by adjusting a voltage of the plurality of generators.

20. The method of claim 19, wherein the output command is a voltage signal.

* * * * *